United States Patent
Wang et al.

(10) Patent No.: US 10,459,287 B2
(45) Date of Patent: Oct. 29, 2019

(54) DISMANTLING DEVICE AND METHOD FOR DISMANTLING BLACKLIGHT UNIT

(71) Applicants: BOE TECHNOLOGY GROUP CO., LTD., Beijing (CN); HEFEI XINSHENG OPTOELECTRONICS TECHNOLOGY CO., LTD., Hefei, Anhui Province (CN)

(72) Inventors: Linlin Wang, Beijing (CN); Zhiyu Qian, Beijing (CN); Qinglong Meng, Beijing (CN); Yinchu Zhao, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 643 days.

(21) Appl. No.: 14/551,566

(22) Filed: Nov. 24, 2014

(65) Prior Publication Data

US 2016/0095268 A1 Mar. 31, 2016

(30) Foreign Application Priority Data

Sep. 26, 2014 (CN) .......................... 2014 1 0504865

(51) Int. Cl.
*G02F 1/13357* (2006.01)
*G02F 1/13* (2006.01)

(52) U.S. Cl.
CPC .......... *G02F 1/1336* (2013.01); *G02F 1/1303* (2013.01); *G02F 1/1309* (2013.01); *Y10T 29/53* (2015.01)

(58) Field of Classification Search
CPC .... G02F 1/1336; G02F 1/1303; G02F 1/1309; Y10T 29/53; Y10T 29/53274; Y10T 29/53283; Y10T 29/49002
(Continued)

(56) References Cited

U.S. PATENT DOCUMENTS

2006/0022684 A1* 2/2006 Ikura .................... H01J 9/42
324/537
2010/0107834 A1* 5/2010 Lai .................... B23D 49/02
83/15
(Continued)

FOREIGN PATENT DOCUMENTS

CN 203344119 U 12/2013
CN 103552107 A 2/2014
(Continued)

OTHER PUBLICATIONS

First Chinese Office Action dated Oct. 9, 2015; Appln. No. 201410504865.1.

*Primary Examiner* — Peter Dungba Vo
*Assistant Examiner* — Azm A Parvez

(57) ABSTRACT

A dismantling device and a method for dismantling a backlight unit are provided, and the dismantling method includes: placing a liquid crystal module that includes a liquid crystal panel and a backlight unit placed oppositely and connected by a bonding portion onto a supporting table; bringing a line cutting portion that includes two ends and a cutting line therebetween into a gap between the liquid crystal panel and the backlight unit, with at least one of the two ends and the liquid crystal module configured to be movable with respect to each other; and applying a cutting force upon the bonding portion with the line cutting portion along a plane where the bonding portion is located, so as to separate the backlight unit from the liquid crystal panel. This (Continued)

method decreases the force upon the backlight unit to reduce chances of damaging the backlight unit during dismantling the same.

17 Claims, 4 Drawing Sheets

(58) Field of Classification Search
USPC .......... 29/700, 762, 764, 806; 156/752, 701, 156/750, 707, 254, 344, 250; 83/16, 15, 83/170, 635, 651.1
See application file for complete search history.

(56) References Cited

U.S. PATENT DOCUMENTS

| | | | |
|---|---|---|---|
| 2012/0138237 A1* | 6/2012 | Hirano | G02F 1/1303 156/701 |
| 2014/0103022 A1 | 4/2014 | Teck | |
| 2014/0196854 A1 | 7/2014 | Lee et al. | |

FOREIGN PATENT DOCUMENTS

| | | |
|---|---|---|
| CN | 103676282 A | 3/2014 |
| WO | 2010/059921 A1 | 5/2010 |

* cited by examiner

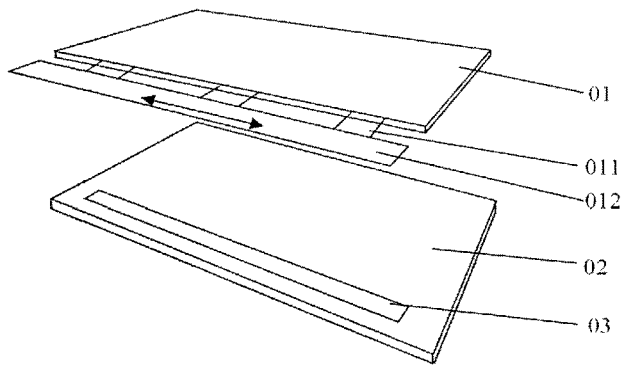

Fig.1

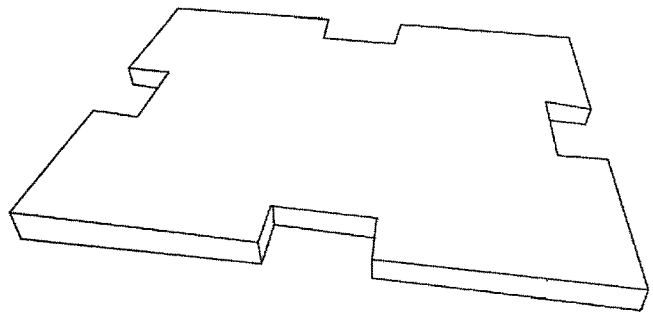

Fig.2

```
┌─────────────────────────────────────────────────────────────┐
│  Placing a liquid crystal module onto a supporting table,   │
│  wherein the liquid crystal module comprises a liquid       │
│  crystal panel and a backlight unit that are placed         │
│  oppositely and connected by a bonding portion              │
└─────────────────────────────────────────────────────────────┘
                              │
                              ▼
┌─────────────────────────────────────────────────────────────┐
│  Bringing a line cutting portion into a gap between the     │
│  liquid crystal panel and the backlight unit                │
└─────────────────────────────────────────────────────────────┘
                              │
                              ▼
┌─────────────────────────────────────────────────────────────┐
│  Applying a cutting force upon the bonding portion between  │
│  the liquid crystal panel and the backlight unit of the     │
│  liquid crystal module through the line cutting portion     │
└─────────────────────────────────────────────────────────────┘
```

Fig.3

DISMANTLING DEVICE AND METHOD FOR DISMANTLING BLACKLIGHT UNIT

TECHNICAL FIELD

At least one embodiment of the present disclosure relates to a dismantling device and a method for dismantling a backlight unit.

BACKGROUND

A backlight unit is one of the components constituting a liquid crystal display (LCD) and is located behind a liquid crystal panel of the liquid crystal display. The illuminant effect of the backlight unit has a direct influence upon the visual effect of the liquid crystal display. The reason is that the liquid crystal display per se does not emit light, but displays figures or word signs by modulating light.

SUMMARY

At least one embodiment of the present disclosure provides a dismantling device including a supporting table and a line cutting portion; the supporting table includes a supporting face configured for supporting an object to be dismantled thereon; and the line cutting portion is provided on the supporting face, and is configured to be movable with respect to the supporting table so as to apply a cutting force upon a bonding portion of the object to be dismantled along a face where the bonding portion is located, the line cutting portion includes two ends and a cutting line between the two ends, and at least one of the two ends is provided on the supporting table.

At least one embodiment of the present disclosure also provides a method for dismantling a backlight unit, and the method includes: placing a liquid crystal module that includes a liquid crystal panel and a backlight unit placed oppositely and connected by a bonding portion onto a supporting table; bringing a line cutting portion into a gap between the liquid crystal panel and the backlight unit, the line cutting portion including two ends and a cutting line between the two ends, and at least one of the two ends and the liquid crystal module configured to be movable with respect to each other; and applying a cutting force upon the bonding portion with the line cutting portion along a plane where the bonding portion is located, so as to separate the backlight unit from the liquid crystal panel.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

FIG. 1 is a schematic view of a liquid crystal module;

FIG. 2 is a schematic view of a supporting table used for dismantling a backlight unit;

FIG. 3 is a flow chart showing a method for dismantling a backlight unit according to one embodiment of the present disclosure;

DETAILED DESCRIPTION

Figure 4:
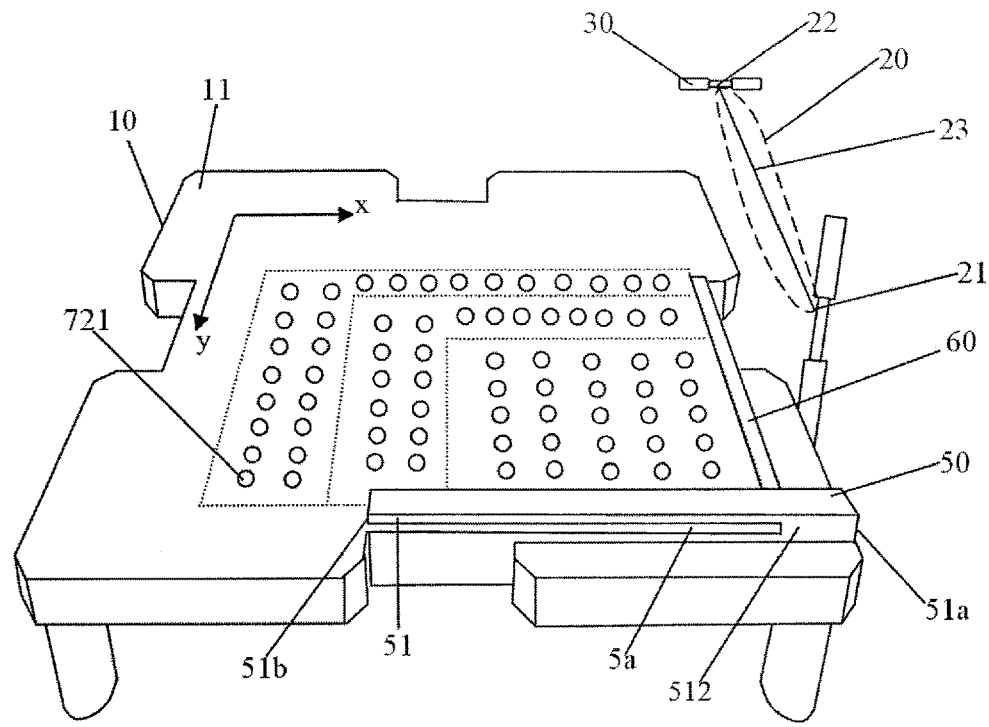
FIG. 4 is a schematic view of a dismantling device according to one embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

FIG. 1 illustrates a schematic view of a liquid crystal module. For a medium-sized or small-sized liquid crystal display, a liquid crystal panel 01 and a backlight unit 02 are commonly combined together through a strip-shaped bonding portion 03. The bonding portion 03 is provided onto the liquid crystal panel 01 at a side where a flexible printed circuit (FPC) board 011 and a rigid printed circuit board 012 are located. The bonding portion 03 may be a double-sided adhesive tape.

During the production process, when a liquid crystal display having abnormal quality occurs, its necessary to repair the liquid crystal display. During the repairing process, the liquid crystal panel 01 and the backlight unit 02 need to be separated, which is called the dismantling of a backlight unit. Presently, a commonly used method for dismantling a backlight unit comprises the following steps: placing horizontally a liquid crystal module to be dismantled onto a supporting table shown in FIG. 2; an operator pressing a surface of the liquid crystal panel 01 using his/her fingers or palm; and simultaneously, adsorbing and lifting a side of the liquid crystal panel 01 and without the bonding portion 03 by using a suction ball; and then pulling up manually the liquid crystal panel 01 till the separation of the liquid crystal panel 01 from the backlight unit 02.

The inventor of the present application noticed that, in the present commonly-used manner of directly separating the liquid crystal panel from the backlight unit by pulling, the backlight unit is subjected to an upward pulling force from the bonding portion, and because such a pulling force mainly acts on the backlight unit, it's easy for the backlight unit to be damaged; secondly, the liquid crystal module is not fixed in the dismantling process, such that the printed circuit board on the liquid crystal panel has greater chances of being damaged in the dismantling process; and furthermore, as to the manner in which the liquid crystal panel is pressed and fixed by fingers or palm, it's not easy to control the pressing force, which can cause the generation of blue spot on the liquid crystal panel, abnormal display of partial pixels and bright spot collection occurring at damaged areas.

With reference to the example of the liquid crystal module formed in the manner illustrated in FIG. 1 and accompanying drawings, the dismantling device and the method for dismantling a backlight unit in embodiments of the disclosure are described in detail in the following. The following embodiments are only exemplary and are not illustrative.

The thicknesses and shapes of all the thin films in the accompanying drawings do not reflect the real scale, the objective of which is merely to schematically describe the embodiments of the present invention.

At least one embodiment of the present disclosure provides a method for dismantling a backlight unit, and as shown in FIG. 3, the dismantling method includes: placing a liquid crystal module that includes a liquid crystal panel and a backlight unit placed oppositely and connected by a bonding portion onto a supporting table; bringing a line cutting portion into a gap between the liquid crystal panel and the backlight unit, the line cutting portion including two ends and a cutting line between the two ends, and at least one of the two ends and the liquid crystal module configured to be movable with respect to each other; and applying a cutting force upon the bonding portion with the line cutting portion along a plane where the bonding portion is located, so as to separate the backlight unit from the liquid crystal panel. By applying the cutting force upon the bonding portion between the liquid crystal panel and the backlight unit, the embodiment of present disclosure can reduce the force upon the backlight unit by the bonding portion and thus effectively depress the chances of damaging the backlight unit, as compared with the manner in which a liquid crystal panel and a backlight unit are directly separated from each other by pulling.

For example, when the dismantling method provided by embodiments of present disclosure is employed to dismantle a liquid crystal module, the supporting table shown in FIG. 2 can be used. In one embodiment, the process for dismantling a backlight unit can include the following step: placing the liquid crystal module horizontally onto the supporting table, bringing the line cutting portion into the gap between the liquid crystal panel 01 and the backlight unit 02 and moving the line cutting portion toward the bonding portion 03, so that the line cutting portion applies the cutting force upon the bonding portion 03 in the process of moving toward the bonding portion 03.

It is to be noted that the line cutting portion is required to meet the requirement of being soft, tenuous and not easy to be broken. In order to avoid generating the static electricity during the process of applying the cutting force upon the bonding portion with the line cutting portion, the line cutting portion can adopt a tough and tensile plastic wire, for example, a fishing wire; and the line cutting portion can also be a metal filament.

For example, as to the manners in which at least one of the two ends of the line cutting portion is movable with respect to the liquid crystal module so that the line cutting portion applies a cutting force upon the bonding portion 03, the following two manners can be included.

Manner one: the line cutting portion applies a cutting force upon the bonding portion 03 when the line cutting portion rotates with respect to the liquid crystal module, and the direction of the cutting force can be changed. For example, the line cutting portion applies a cutting force upon the bonding portion 03 when the line cutting portion rotates, or, the line cutting portion applies a cutting force upon the bonding portion 03 when the liquid crystal module rotates.

Manner two: the line cutting portion applies a cutting force upon the bonding portion 03 when the line cutting portion is making a linear motion relative to the liquid crystal module, that is, the line cutting portion applies this cutting force upon the bonding portion during its translational motion, or, the line cutting portion applies this cutting force upon the bonding portion when the liquid crystal module is making a translational motion, and in this case, the direction of the cutting force does not change. In the liquid crystal module shown in FIG. 1, the bonding portion 03 between the liquid crystal panel 01 and the backlight unit 02 usually presents a strip rectangular structure, namely including a long side and a short side. Accordingly, in the methods for dismantling a backlight unit provided by various embodiments, the line cutting portion can apply a cutting force to the long side or short side of the bonding portion 03 in the liquid crystal module, here the direction of the cutting force is perpendicular to the long side or short side of the bonding portion 03. Comparing the manner in which the short side of the bonding portion is subjected to the cutting force applied by the line cutting portion and the manner in which the long side of the bonding portion is applied the cutting force by the line cutting portion, when the forces applied by the operator are equal, the short side bears a greater intensity of pressure than the long side. It can be seen from this that, the manner in which the line cutting portion applies a cutting force upon the short side of the bonding portion is more labor-saving and easier to achieve the separation of the liquid crystal panel 01 from the backlight unit 02.

Comparing the manner one with the manner two, because the direction of the cutting force applied by the line cutting portion to the bonding portion 03 can be changed in manner one, the operator can flexibly regulate the size and direction of the applied force according to practical situation during the process of dismantling a backlight unit, which depresses the chances of scratching the surface of the liquid crystal panel 01 and/or the surface of the backlight unit 02 by the line cutting portion.

In one embodiment, the method for dismantling a backlight unit can further include: before bringing the line cutting portion into the gap between the liquid crystal panel and the backlight unit, lifting a side of the liquid crystal panel and without the bonding portion toward the direction away from the backlight unit. The manners for lifting the liquid crystal panel according to the embodiment of present disclosure are not limited. For example, the liquid crystal panel can be lifted with a suction ball known to a person skilled in this art;

and for example, the suction ball can be provided on the dismantling device described hereinafter.

In one embodiment, the method for dismantling a backlight unit can further include: before bringing the line cutting portion into the gap between the liquid crystal panel and the backlight unit, supporting the flexible printed circuit board of the backlight unit onto the supporting face. Supporting the flexible printed circuit board can effectively reduce the chances of damaging the flexible printed circuit board.

The method for dismantling a backlight unit provided by embodiments of present disclosure can employ the supporting table shown in FIG. 2, and can also employ a dismantling device so as to facilitate the dismantling operation for an operator. A dismantling device provided by at least one embodiment of the present disclosure includes: a supporting table including a supporting face that is configured for supporting an object to be dismantled thereon; and a line cutting portion provided on the supporting face and configured to be movable with respect to the supporting table so as to apply a cutting force upon a bonding portion of the object to be dismantled along a plane where the bonding portion is located. The line cutting portion includes two ends and a cutting line therebetween, and at least one of the two ends is provided on the supporting table. In the dismantling device provided by the embodiment of present disclosure, at least one end of the line cutting portion applying a cutting force to the bonding portion is provided on the supporting table, which can help an operator to control the line cutting portion, so as to depress the chances of scratching the surface of the liquid crystal panel and/or the surface of the backlight unit by the line cutting portion, as compared with the manner in which the line cutting portion and the supporting table are independent of each other.

The dismantling device provided by embodiments of present disclosure is applicable for the liquid crystal module formed by assembling the liquid crystal panel and the backlight unit in the manner shown in FIG. 1, and also applicable for the combination of two plate structures connected together through a bonding portion. Accordingly, the following embodiments will make a description with respect to the example that the object to be dismantled is a liquid crystal module, and the liquid crystal module includes a liquid crystal panel and a backlight unit that are placed oppositely and connected with each other by a bonding portion and a flexible printed circuit board connected to a side of the liquid crystal panel.

Figure 5:
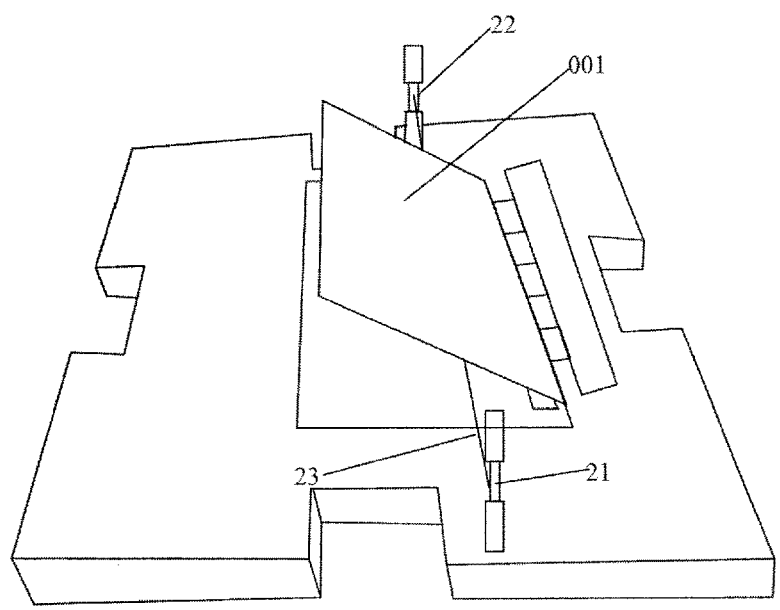
FIG. 5 is a schematic view of a dismantling device according to another embodiment of the present disclosure.

As shown in FIGS. 4 and 5, the dismantling device provided by at least one embodiment of the present disclosure includes a supporting table 10 used for supporting a liquid crystal module 001 and a line cutting portion 20 used for applying a cutting force upon the bonding portion of the liquid crystal module 001. The supporting table 10 includes a supporting face 11 configured for supporting the liquid crystal module 001 thereon. The line cutting portion 20 includes two ends 21, 22 and a cutting line 23 therebetween, and at least one of the two ends 21, 22 of the line cutting portion 20 is provided on the supporting table 10, and thus by making the at least one of the two ends 21, 22 movable with respect to the liquid crystal module 001, the cutting force can be applied to the bonding portion 03 by the line cutting portion 20. In the dismantling device provided by the embodiment of present disclosure, the line cutting portion 20 is provided on the supporting table 10, and this can help the operator control the line cutting portion 20, so as to depress the chances of scratching the surface of the liquid crystal panel 01 and/or the surface of the backlight unit 02 by the line cutting portion 20.

The line cutting portion 20 can employ the above-mentioned manner one or manner two to achieve applying a cutting force upon the bonding portion 03.

When manner one is used, that is, when the line cutting portion 20 applies the cutting force upon the bonding portion 03 in the process of rotating with respect to the liquid crystal module, the two ends of the line cutting portion 20 can comprise a free end and a fixed end provided on the supporting table respectively, and the free end can be configured to be rotatable above the supporting face; or both the two ends of the line cutting portion 20 can be fixed ends provided on the supporting table, and the supporting face on the supporting table can rotate with respect to the line cutting portion.

For example, as shown in FIG. 4, the two ends 21, 22 of the line cutting portion 20 are a fixed end fixed to the supporting table 10 and a free end moveable in optional directions, respectively. For example, the fixed end 21 can be fixed to the supporting table 10 through an upright which can be of a fusiform structure with a concave center and two wider ends, for example. To facilitate operation, in various embodiments, at least one of the two ends 21, 22 of the line cutting portion can include a cutting line receiving portion configured for receiving and releasing the cutting line. For example, the free end 22 can include a cutting line receiving portion 30, and the cutting line receiving portion 30 can be of a fusiform structure around which the free end 22 can be wound. When the free end 22 is provided with a cutting line receiving portion 30, the length of the line cutting portion 20 can be changed, such that the dismantling device provided by embodiments of present disclosure is more applicable for liquid crystal modules of different sizes, and thus the versatility of the dismantling device is improved. During the process of dismantling a backlight unit, the free end 22 can rotate around the liquid crystal module 001 so as to drive the cutting line 23 rotate, and accordingly, the line cutting portion 20 applies a cutting force upon the bonding portion 03 of the liquid crystal module in the rotating process. Certainly, embodiments of present disclosure are not limited thereto, and for example, both the fixed end 21 and the free end 22 can include cutting line receiving portions.

For example, as shown in FIG. 5, each of the two ends 21, 22 of the line cutting portion 20 can be a fixed end provided on the supporting table 10, the placement manner can refer to the above-mentioned description, and the repetition thereof is omitted here. In the process of dismantling a backlight unit, the two fixed ends 21, 22 of the line cutting portion 20 tighten the cutting line 23, the liquid crystal module 001 is fixed onto the supporting face, and while the supporting face rotates, the liquid crystal module 001 also takes a rotary motion under the driving of the supporting face, so that the line cutting portion 20 applies a cutting force upon the bonding portion 03 when the liquid crystal module 001 rotates. Certainly, embodiments of present disclosure are not limited thereto. For example, the supporting face can also do not rotate, but the liquid crystal module 001 takes a rotary motion under the pushing action by a force parallel to the supporting face.

When manner two is employed, that is, when the line cutting portion 20 applies a cutting force upon the bonding portion 03 in a process that the line cutting portion 20 is taking a linear motion with respect to the liquid crystal module, the line cutting portion 20, each of the two ends of the line cutting portion 20 can be a fixed end provided on the supporting table, and the cutting line between the two fixed ends is configured to be able to make translational motion with respect to the supporting face; or both the two ends of the line cutting portion 20 can be configured to be free ends provided on the supporting table, and the cutting line between the two free ends is configured to be able to make translational motion with respect to the supporting face.

The dismantling device shown in FIG. 5 can be used in the above-mentioned manner one, that is, the liquid crystal module 001 is made to rotate and during this rotation, the line cutting portion 20 applies a cutting force to the bonding portion 03. The dismantling device shown in FIG. 5 can also be used in the above-mentioned manner two. For example, in one embodiment, both the two ends 21, 22 of the line cutting portion 20 are fixed ends which tighten the cutting line 23; the liquid crystal module 001 is fixed onto the supporting face, and while the supporting face translates with respect to the cutting line 23, the liquid crystal module 001 also translates with respect to the cutting line 23 under the driving of the supporting face, that is, makes linear motion, and thus it is achieved that the line cutting portion 20 applies a cutting force to the long side or short side of the bonding portion 03 when the liquid crystal module 001 is making linear motion.

In another embodiment employing the above-mentioned manner two, both the two ends of the line cutting portion can be free ends movably provided onto the supporting table, and the cutting line between the two free ends is configured to be able to translate relative to the supporting face. For example, both ends of the line cutting portion can be connected with an upright separately, there are correspondingly groove structures for the movement of the uprights on the supporting table, and the uprights drive the two ends of the line cutting portion to move while sliding in the grooves. During the process of dismantling a backlight unit, the two ends of the line cutting portion can tighten the cutting line and synchronously move toward the liquid crystal module, so as to realize that the line cutting portion applies a cutting force upon the long side or short side of the bonding portion 03 when the line cutting portion is making linear motion.

As shown in FIG. 4, the dismantling device provided by at least one embodiment of the present disclosure can further include an FPC-end supporting portion 51 provided at a side of the supporting table and used for placing the flexible printed circuit board 011 of the liquid crystal module thereon, and the FPC-end supporting portion 51 includes a supporting pole 512 supported on the supporting table 10. For example, the FPC-end supporting portion 51 can adopt a triangle columnar structure or a plate structure. In the method of directly separating the liquid crystal panel from the backlight unit, because the liquid crystal module is not fixed, especially the flexible printed circuit board is not fixed, the flexible printed circuit board is very easy to be damaged. By providing the FPC-end supporting portion 51 used for supporting the flexible printed circuit board 011 of the liquid crystal module, the dismantling device provided by the embodiment of present disclosure can effectively depress the chances of damaging the flexible printed circuit board.

In the dismantling device provided by the above embodiments of the present disclosure, at least one opening can be formed between the FPC-end supporting portion 51 and the supporting table 10, or the FPC-end supporting portion 51 can include at least one opening, and the cutting line of the line cutting portion can move in the at least one opening and pass through the same when in use. Because a side of the FPC-end supporting portion 50 facing the supporting table 10 is provided with an opening and the PCB of the liquid crystal panel 01 can be placed onto the FPC-end supporting portion 51, during the process of dismantling a backlight unit, by moving the line cutting portion in the opening, it's possible to prevent the PCB from being damaged when the line cutting portion applies a cutting force to the bonding portion, and thus to further depress the chances of damaging the printed circuit board.

Figure 6:
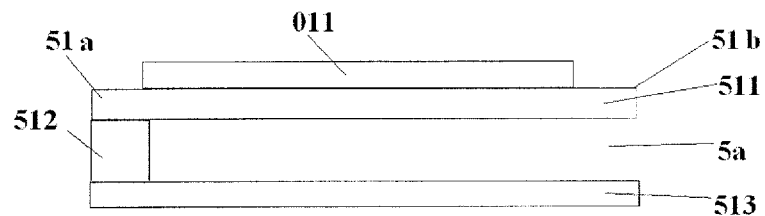
FIG. 6 is a schematic section view showing one opening that is formed at a side of an FPC-end supporting portion facing a supporting table according to one embodiment of the present disclosure.

In one embodiment, the FPC-end supporting portion 51 can include at least one opening. As shown in FIG. 6, the FPC-end supporting portion 51 includes a top plate 511, a supporting pole 512 and a bottom plate 513 provided between the supporting pole 512 and the supporting table 10. The FPC-end supporting portion 51 includes a first end 51a and a second end 51b along its length direction; a supporting pole 512 is provided at the first end 51a; and an opening 5a is formed at the second end 51b and between the top plate 511 and the bottom plate 513 of the FPC-end supporting portion 51. During the process of dismantling a backlight unit, the line cutting portion 20 can enter the opening 5a from the second end 51b, and move toward the first end 51a until the separation of the liquid crystal panel 01 from the backlight unit 02.

Figure 7:
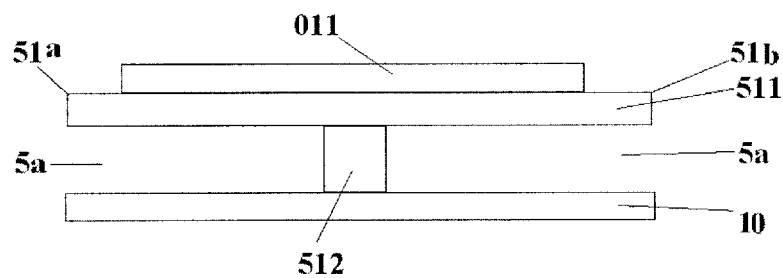
FIG. 7 is a schematic section showing two openings that are formed at a side of an FPC-end supporting portion facing a supporting table according to one embodiment of the present disclosure.

In one embodiment, two openings can be formed between the FPC-end supporting portion 51 and the supporting table 10. As shown in FIG. 7, the supporting pole 512 is provided at the intermediate position between the FPC-end supporting portion 51 and the supporting table 10, and thus forms an opening 5a at both sides of the supporting pole 512 respectively. This embodiment is applicable to the above-mentioned case in which the liquid crystal module rotates with respect to the line cutting portion when both the two ends of the line cutting portion are configured to be fixed ends.

In order to further protect the flexible printed circuit board and depress the chances of damaging the flexible printed circuit board 011 during the process of dismantling a backlight unit, in a dismantling device provided by one embodiment of the present disclosure, the FPC-end supporting portion 51 can include a slant-face supporting structure used for the placement of the flexible printed circuit board, and the slant-face supporting structure is provided at a side of the FPC-end supporting portion 51 away from the supporting table 10. During the process of dismantling a backlight unit, the printed circuit board is placed onto the slant-face supporting structure. For example, the FPC-end supporting portion 51 can be of a triangle columnar structure, one lateral surface of which is parallel to the supporting table 10 and is supported by the supporting pole 512, and one lateral surface of which is used as the slant-face supporting structure and used for the placement of the printed circuit board. Embodiments of present disclosure are not limited thereto.

As shown in FIG. 4, the dismantling device provided by at least one embodiment of the present disclosure can further include a first positioning portion 50 provided on the supporting table and used for preventing the liquid crystal module from moving on the supporting face along a first direction.

In various embodiments, the first positioning portion 50 can include at least one columnar or platelike structure. Description will be made taking the first positioning portion 50 including a cuboid columnar structure as an example. Because the line cutting portion 20 can apply a cutting force upon the long side or the short side of the bonding portion 03 when the line cutting portion 20 is taking linear motion relative to the liquid crystal module, in a dismantling device provided by one embodiment, the length direction of the first positioning portion 50 can be perpendicular to the direction of the cutting force applied by the line cutting portion and to the bonding portion 03, here the force the first positioning portion 50 acts upon the liquid crystal module can be canceled out mutually with the force the line cutting portion 20 acts upon the bonding portion 03 as much as possible, so as to prevent the liquid crystal module from moving on the supporting face in the direction of the applied cutting force (i.e., one example of the first direction), and to acting for fixing the liquid crystal module.

Because the line cutting portion 20 can apply a cutting force upon the bonding portion 03 when the same rotates relative to the liquid crystal module, in such a case, the line cutting portion 20 can apply a cutting force to both the long side and the short side of the bonding portion 03 simultaneously, the direction of such a force follows a tilt direction between the long side direction and the short side direction of the bonding portion as a whole, and here it's not suitable for making the length direction of the first positioning portion 50 perpendicular to the direction of the cutting force. Therefore, in a dismantling device provided by one embodiment, the first positioning portion 50 can be configured to have its length direction parallel to the length direction of the rigid printed circuit board 012 (as shown in FIG. 1, a direction along the double arrow), and this can prevent the liquid crystal module from moving along the direction where its rigid printed circuit board 012 is located (that is, one example of the first direction), and act for protecting the flexible printed circuit board 011 on the liquid crystal panel 01. Certainly, embodiments of present disclosure are not limited thereto. For example, the length direction of the first positioning portion 50 can also be perpendicular to the length direction of the PCB.

The above embodiment provides an example in which the first positioning portion 50 includes a cuboid columnar structure; but embodiments of present disclosure are not limited thereto. For example, the first positioning portion can also include a triangular prism, a trapezoid prism or a hollow tubular cylinder. For example, when the first positioning portion is a triangular prism, the upper bottom surface and the lower bottom surface thereof can be right triangles, and the direction of the edge between the upper bottom surface and the lower bottom surface is the length direction of the first positioning portion in embodiments of present disclosure. A lateral surface where one right-angle side of the right triangle is located can be fixed onto the supporting table with screws, and the lateral surface where another right-angle side is located is used for the positioning of the liquid crystal module. For example, the triangular prism can be a hollow structure, so as to make it easier to fix the same onto the supporting table and to save the material cost. Furthermore, when the first positioning portion 50 includes a plurality of columnar or platelike structures, the plurality of columnar or plate like structures can be provided onto the supporting table 10 side by side, and here the length direction of the first positioning portion in the above-mentioned embodiments is the arrangement direction of the plurality of columnar or platelike structures.

The dismantling device provided by the above-mentioned embodiments can further include a second positioning portion 60 provided on the supporting table 10 and used for preventing the liquid crystal module from moving on the supporting face along a second direction, and the second direction forms a certain angle with the first direction.

Hereinafter, a description will be made with the example that the first direction and the second direction are perpendicular to each other, and each of the first positioning portion 50 and the second positioning portion 60 is of a cuboid columnar structure. As shown in FIG. 4, the direction x and the direction y are perpendicular mutually, the length direction of the first positioning portion 50 is perpendicular to the direction y, and the direction of the second positioning portion 60 is perpendicular to the direction x. When the liquid crystal module is placed to be tightly stuck to the first positioning portion 50 and the second positioning portion 60, the first positioning portion 50 can prevent the liquid crystal module from moving along the direction y, the second positioning portion 60 can prevent the liquid crystal module from moving along the direction x, here the first direction is the direction y, and the second direction is the direction x.

In various embodiments, the second positioning portion 60 can include at least one columnar or platelike structure, the specific embodiments thereof can refer to related description of the first positioning portion 50, and the repetition thereof is omitted herein. By the first positioning portion 50 and the second positioning portion 60, the liquid crystal module can be fixed from different directions parallel to the supporting face, which further depresses the chances of damaging the printed circuit board in the dismantling process.

In the above-mentioned embodiments, the first positioning portion 50 and/or the second positioning portion 60 can be provided onto the supporting table 10 in magnetic adsorption manner. For example, as shown in FIG. 7, strong magnet adsorption devices 40 are provided at a side of the supporting table 10 and the underside of the second positioning portion 60. By providing the first positioning portion 50 and/or the second positioning portion 60 onto the supporting table 10 in the magnetic adsorption manner, the versatility of the dismantling device provided by embodiments of present disclosure can be further improved, such that the dismantling device is even more applicable for environments, such as product assembly, panel wipe, panel film lamination and the like.

It is to be noted that, the heights of the first positioning portion 50 and the second positioning portion 60 can be less than or equal to the thickness of the backlight unit 02 of the liquid crystal module. Thereby during the process of dismantling a backlight unit, the line cutting portion 20 can pass easily below the flexible printed circuit board 011, to avoid damaging the flexible printed circuit board 011. For example, the first positioning portion 50 has a height identical to that of the second positioning portion 60, such that there's no height difference between the first positioning portion 50 and the second positioning portion 60, and that the line cutting portion 20 can pass below the flexible printed circuit board 011 even more easily to avoid damaging the flexible printed circuit board 011.

Figure 9:
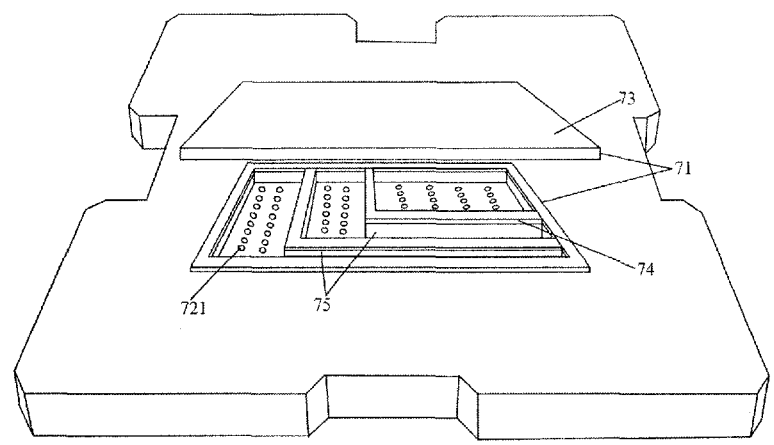
FIG. 9 is a schematic view showing a vacuum adsorption device according to one embodiment of the present disclosure.

In the above-mentioned embodiments, the supporting pole 512 can be provided onto the supporting table 10 or the first positioning portion 50 or the second positioning portion 60. For example, when the length direction of the first positioning portion 50 is parallel to the length direction of the PCB, the supporting pole 512 can be placed onto the first positioning portion 50, as shown in FIG. 9. For example, when the length direction of the first positioning portion 50 is perpendicular to the length direction of the PCB, and the length direction of the second positioning portion 60 is parallel to the length direction of the PCB, the supporting pole 512 can be placed onto the second positioning portion 60.

In the above-mentioned embodiments, the supporting pole can be configured to be movable. For example, a groove can be provided on the supporting table 10 or the first positioning portion 50 or the second positioning portion 60 and the FPC-end supporting portion 51, and the supporting pole 512 can slide along the groove. In this way, the size of the opening 5a below the FPC-end supporting portion 51 can be changed by regulating the position of the supporting pole 512, which improves the versatility of the dismantling device, and makes the dismantling device applicable to liquid crystal modules of different dimensions.

In the above-mentioned embodiments, the supporting pole 512 can be configured to be detachable or non-detachable. For example, the supporting pole 512 can be coupled with the first positioning portion 50 in a non-detachable way. For example, the supporting pole 512, the FPC-end supporting portion 51 and the first positioning portion 50 can be integrally formed, as shown in FIG. 4. For example, the supporting pole 512 can be coupled to the supporting table 10 or the first positioning portion 50 in a detachable way, for example, coupled through screws, and this can further improve the versatility of the dismantling device provided by embodiments of present disclosure, so that the dismantling device can also apply to the environments, such as product assembly, panel wipe, panel film lamination and the like.

Figure 8:
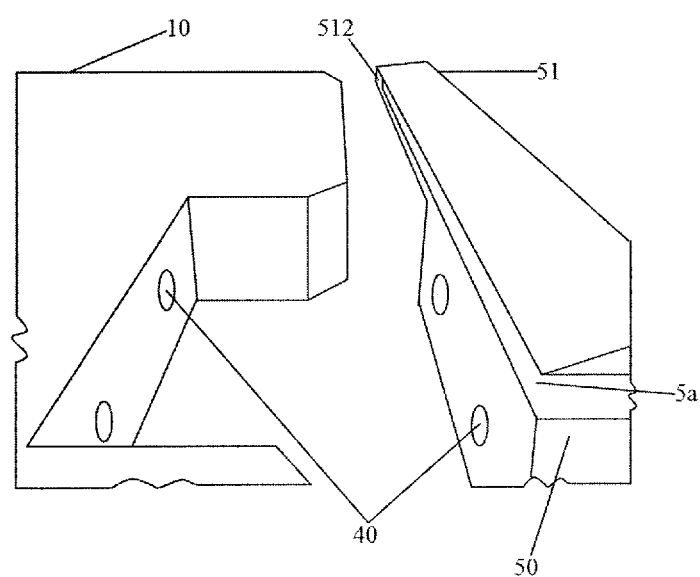
FIG. 8 is a schematic view showing a magnetic adsorption manner according to one embodiment of the present disclosure.

In order to further fix the liquid crystal module so as to decrease the damage to the liquid crystal panel 01 when the liquid crystal panel 01 is pressed by fingers or palm, in the above-mentioned embodiments, a vacuum adsorption device including a plurality of adsorption apertures can be provided on the supporting face 11 of the supporting table 10. For example, in one embodiment, as shown in FIGS. 4 and 8, the supporting table 10 includes a vacuum adsorption device 71, and the vacuum adsorption device 71 is provided with a plurality of adsorption apertures 721 at the position corresponding to the supporting face 11. The vacuum adsorption device is used for adsorbing the liquid crystal module so as to fix the liquid crystal module in the direction perpendicular to the supporting face 11. As shown in FIG. 8, the supporting table 10 further includes a bottom surface 73 placed opposite to the supporting face 11 and used for sealing the above-mentioned vacuum adsorption device 71.

Presently, most of the liquid crystal modules have a dimension ranging from 7 inch to 14 inch. In order to realize the rational utilization of the vacuum and the decrease of the vacuum consumption and cost, the vacuum adsorption device 71 can be designed into a plurality of vacuum areas, the vacuum adsorption operation of each of which can be independently controlled. For example, the vacuum adsorption device 71 includes a plurality of division frames 75 which divide the vacuum adsorption device 71 into a plurality of zones, and the plurality of zones corresponds to different adsorption apertures. For example, the divided plurality of zones can respectively apply to the liquid crystal modules of the following dimensions: less than 7 inch, 7 inch to 10.1 inch, and 10.1 inch to 14 inch. For example, the dimension of a liquid crystal module is 10.1 inch, and during the process of dismantling a backlight unit, the two minor vacuum areas shown in FIG. 8 can be used. In order to improve the sealability of the vacuum areas, the division frames 75 can be provided with seals 74, for example, seal rubbers.

A detailed description will be made about the working process of the dismantling device provided by an embodiment of present invention, taking the dismantling device shown in FIG. 4 and the line cutting portion 20 including one fixed end and a free end as an example.

Step one, the liquid crystal module to be dismantled is horizontally placed onto the supporting table 10 and is made to be tightly stuck to the first positioning portion 50 and the second positioning portion 60, and the flexible printed circuit board 011 of the liquid crystal panel 01 is placed onto the FPC-end supporting portion 51. Afterwards, the control switch of the vacuum adsorption device is turned on so as to fix the liquid crystal module to be dismantled in the horizontal and vertical directions simultaneously.

Step two, one end of the liquid crystal panel 01 and without the bonding portion 03 is adsorbed and lifted upward using a suction ball, the free end 22 of the line cutting portion 20 is moved to straighten the line cutting portion 20, and the line cutting portion 20 rotates with respect to the direction of the opening 5a and enter into the gap between the liquid crystal panel 01 and the backlight unit 02.

Step three, the line cutting portion 20 enters the opening 5a from the second end 51b of the FPC-end supporting portion 51, and the line cutting portion 20 moves in the opening 5a toward the position where the supporting pole 512 is located, so as to apply a cutting force to the bonding portion 03, and until the liquid crystal panel 01 is separated from the backlight unit 02, the movement of the line cutting portion 20 is stopped.

Generally speaking, the dismantling device and the method for dismantling a backlight unit provided by at least one embodiment of the present disclosure have the following advantages.

1. During the process of dismantling a backlight unit, by applying a cutting force upon a bonding portion between a liquid crystal panel and a backlight unit, the embodiment of present disclosure can reduce the force the bonding portion acts upon the backlight unit and thus effectively depress the chances of damaging the backlight unit, as compared with the manner in which a liquid crystal panel and a backlight unit are directly separated from each other by pulling.

2. In the embodiment of present disclosure, the line cutting portion can apply a cutting force upon a short side of the bonding portion, and this can make it easier to achieve the separation of the liquid crystal panel from the backlight unit; or the line cutting portion and liquid crystal module can rotate with respect to each other, so as to depress the chances that the line cutting portion scratches the surface of the liquid crystal panel and/or the surface of the backlight unit.

3. In the embodiment of present disclosure, by using the combination of a first positioning portion and a second positioning portion and the vacuum adsorption in the vertical direction to fix the liquid crystal module, it's possible to avoid the occurrence of blue spot on the liquid crystal panel when the same is pressed by fingers or palm, and further, the vacuum adsorption device can be provided with a plurality of vacuum areas, so as to achieve the rational utilization of vacuum and the decrease of vacuum consumption and cost.

4. In the embodiment of present disclosure, an FPC-end supporting portion is employed for the placement of the flexible printed circuit board on the liquid crystal panel, which effectively depresses the chances of damaging the flexible printed circuit board.

5. In the embodiment of present disclosure, by using magnetic adsorption manner to place the first positioning portion and/or the second positioning portion on the supporting table, the versatility of backlight unit dismantling device can be improved.

What are described above is related to the illustrative embodiments of the disclosure only and not limitative to the scope of the disclosure; the scopes of the disclosure are defined by the accompanying claims.

This application claims the benefit of Chinese Patent Application No. 201410504865.1, filed on Sep. 26, 2014, which is hereby entirely incorporated by reference.

The invention claimed is:

1. A dismantling device, comprising:
   a supporting table comprising a supporting face which is configured for supporting an object to be dismantled thereon;
   a linear cutting portion, provided on the supporting face, and configured to be movable with respect to the supporting table so as to apply a cutting force on a bonding portion of the object to be dismantled along a plane where the bonding portion is located,
   wherein the linear cutting portion comprises two ends and a cutting line between the two ends, and at least one of which is provided on the supporting table; a supporting portion provided at a side of the supporting table;
   at least one opening is formed between the supporting portion and the supporting table, or the supporting portion comprises at least one opening, an extension direction of the at least one opening is parallel to the supporting face;
   the cutting line of the line cutting portion is configured to be able to enter the at least one opening and pass through the same in use with a movement direction of the cutting line in the at least one opening being parallel to the extension direction of the at least one opening;
   the object to be dismantled is a liquid crystal module comprising a liquid crystal panel and a backlight unit that are placed oppositely and connected with each other by a bonding portion, and a flexible printed circuit (FPC) board connected to a side of the liquid crystal panel, and
   the supporting portion comprises an FPC-end supporting portion configured for placing the flexible printed circuit board of the liquid crystal module thereon, and the FPC-end supporting portion comprises a supporting pole supported on the supporting table; and
   the FPC-end supporting portion comprises a slant-face supporting structure used for placement of the flexible printed circuit board, and the slant-face supporting structure is provided at the side of the FPC-end supporting portion away from the supporting table.

2. The dismantling device according to claim 1, wherein the two ends comprise a free end and a fixed end which is provided on the supporting table, and the free end is configured to be rotatable above the supporting face; or both the two ends are fixed ends provided on the supporting table, and the supporting face is configured to be rotatable with respect to the linear cutting portion on the supporting table.

3. The dismantling device according to claim 1, wherein both the two ends are fixed ends provided on the supporting table, and the cutting line between the two fixed ends is configured to be movable in a translational manner with respect to the supporting face; or both the two ends are free ends provided on the supporting table, and the cutting line between the two free ends is configured to be movable in a translational manner with respect to the supporting face.

4. The dismantling device according to claim 2, wherein the object to be dismantled is a liquid crystal module comprising a liquid crystal panel and a backlight unit that are placed oppositely and connected with each other by a bonding portion and a flexible printed circuit (FPC) board connected to a side of the liquid crystal panel,
   the supporting portion comprises an FPC-end supporting portion provided at a side of the supporting table and used for placing the flexible printed circuit board of the liquid crystal module thereon, and the FPC-end supporting portion comprises a supporting pole supported on the supporting table.

5. The dismantling device according to claim 3, wherein the object to be dismantled is a liquid crystal module comprising a liquid crystal panel and a backlight unit that are placed oppositely and connected with each other by a bonding portion and a flexible printed circuit (FPC) board connected to a side of the liquid crystal panel,
   the supporting portion comprises an FPC-end supporting portion provided at a side of the supporting table and used for placing the flexible printed circuit board of the liquid crystal module thereon, and the FPC-end supporting portion comprises a supporting pole supported on the supporting table.

6. The dismantling device according to claim 1, further comprising a first positioning portion provided on the supporting table and configured for preventing the object to be dismantled from moving on the supporting face along a first direction.

7. The dismantling device according to claim 6, further comprising a second positioning portion provided on the supporting table and configured for preventing the object to be dismantled from moving on the supporting face along a second direction, wherein the second direction forms a certain angle with the first direction.

8. The dismantling device according to claim 7, wherein at least one of the first positioning portion and the second positioning portion is provided onto the supporting table in a magnetic adsorption manner.

9. The dismantling device according to claim 7, wherein at least one of the first positioning portion and the second positioning portion comprises at least one columnar or plate-shaped structure.

10. The dismantling device according to claim 1, wherein at least one of the two ends of the linear cutting portion comprises a cutting line receiving portion configured for receiving and releasing the cutting line.

11. The dismantling device according to claim 1, wherein the supporting face is provided with a vacuum adsorption device comprising a plurality of adsorption apertures.

12. The dismantling device according to claim 11, wherein the vacuum adsorption device comprises a plurality of division frames, and the plurality of the division frames divide the vacuum adsorption device into a plurality of zones, each of which corresponds to different adsorption apertures.

13. A method of using the dismantling device according to claim 1 for dismantling a backlight unit, comprising:
    placing the liquid crystal module onto the supporting table, wherein the supporting portion comprises two ends along a length direction of the supporting portion;
    bringing the linear cutting portion into the gap between the liquid crystal panel and the backlight unit;
    applying a cutting force upon the bonding portion with the linear cutting portion along a plane where the bonding portion is located, so as to separate the backlight unit from the liquid crystal panel, wherein the linear cutting portion enters the at least one of the openings from one end and moves toward the other end of the supporting portion with the movement direction of the cutting line in the at least one opening being parallel to the extension direction of the at least one opening.

14. The method according to claim 13, wherein
    the linear cutting portion applies the cutting force upon the bonding portion during its rotation or translational motion; or the linear cutting portion applies the cutting force upon the bonding portion during the rotation or translational motion of the liquid crystal module.

15. The method according to claim 13, wherein the linear cutting portion applies the cutting force to a long side or a short side of the bonding portion.

16. The method according to claim 13, further comprising:
before bringing the linear cutting portion into the gap between the liquid crystal panel and the backlight unit, lifting a side of the liquid crystal panel and without the bonding portion toward a direction away from the backlight unit.

17. The method according to claim 13, further comprising:
before bringing the linear cutting portion into the gap between the liquid crystal panel and the backlight unit, supporting the flexible printed circuit board of the backlight unit onto the FPC-end supporting portion.

* * * * *